(12) United States Patent
Bergant et al.

(10) Patent No.: US 8,818,954 B1
(45) Date of Patent: Aug. 26, 2014

(54) CHANGE TRACKING

(75) Inventors: Milena Bergant, San Mateo, CA (US); Matthew C. McCline, Foster City, CA (US); Alon Goldshuv, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/077,935

(22) Filed: Mar. 31, 2011

(51) Int. Cl.
*G06F 17/30* (2006.01)

(52) U.S. Cl.
USPC ........................................ 707/645; 707/649

(58) Field of Classification Search
CPC ............... G06F 17/30327; G06F 17/30008; G06F 17/30595; G06F 17/30353; G06F 17/30227; G06F 17/30306; G06F 17/2288; G06F 17/241
USPC .................................................. 707/645, 649
See application file for complete search history.

(56) References Cited

U.S. PATENT DOCUMENTS

| | | | |
|---|---|---|---|
| 5,640,561 A | 6/1997 | Satoh et al. | |
| 5,740,432 A | 4/1998 | Mastors | |
| 6,408,310 B1 | 6/2002 | Hart | |
| 6,732,123 B1 | 5/2004 | Moore et al. | |
| 6,823,349 B1* | 11/2004 | Taylor et al. | 1/1 |
| 7,039,660 B2 | 5/2006 | Kitsuregawa et al. | |
| 7,937,368 B2 | 5/2011 | Jacobs et al. | |
| 7,991,745 B2 | 8/2011 | Bourbonnaise et al. | |
| 8,234,317 B1* | 7/2012 | Pogde | 707/821 |
| 2002/0103804 A1 | 8/2002 | Rothschild et al. | |
| 2004/0267835 A1* | 12/2004 | Zwilling et al. | 707/202 |
| 2005/0251625 A1* | 11/2005 | Nagae et al. | 711/129 |
| 2006/0047713 A1* | 3/2006 | Gornshtein et al. | 707/202 |
| 2008/0120470 A1 | 5/2008 | Dhamankar et al. | |
| 2008/0263579 A1 | 10/2008 | Mears et al. | |

\* cited by examiner

*Primary Examiner* — Apu Mofiz
*Assistant Examiner* — Fariborz Khoshnoodi
(74) *Attorney, Agent, or Firm* — Sean M. Evans; Theodore A. Chen; Krishnendu Gupta

(57) ABSTRACT

A method, article of manufacture, and apparatus for recovering databases. In some embodiments, this includes switching an active segment to change tracking mode, intercepting write related changes on the active segment while in the change tracking mode, populating a change tracking log based on the intercepted write related changes, and storing the populated change tracking log in a storage device. In some embodiments, the storage device is memory. In some embodiments, the change tracking log if flushed from memory to disk.

7 Claims, 4 Drawing Sheets

CHANGE TRACKING

CROSS REFERENCE TO RELATED APPLICATIONS

This application is related to co-pending U.S. patent application Ser. No. 13/077,939 for RESYNCHRONIZATION OF NONACTIVE AND ACTIVE SEGMENTS and filed concurrently herewith, which is incorporated herein by reference for all purposes, and to co-pending U.S. patent application Ser. No. 13/077,942 for COMPACTED CHANGE LOGS and filed concurrently herewith, which is incorporated herein by reference for all purposes.

FIELD OF THE INVENTION

This invention relates generally to databases, and more particularly to systems and methods for recovering databases.

BACKGROUND OF THE INVENTION

Databases typically have a redundant copy of data for fault tolerance. If a primary copy of data goes down, a mirror copy of data may take its place so that the database's downtime is minimized.

When bringing back the primary copy, conventional methods typically copy over all the data from the mirror. This method may be acceptable in small databases, or in environments where the transfer time is not an issue. However, this method does not scale very well. In large databases, it may be expensive and costly to transfer large amounts of data from the mirror to primary, or vice versa.

Some conventional methods also require the mirror copy to be non-active, or offline, when transferring data to the primary. This, too, may be prohibitively expensive. For example, a database which keeps track of commercial transactions may cost a company millions of dollars in revenue if the database is offline for a prolonged period of time.

There is a need, therefore, for an improved method, article of manufacture, and apparatus for resynchronizing primary and mirror copies.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Figure 1:
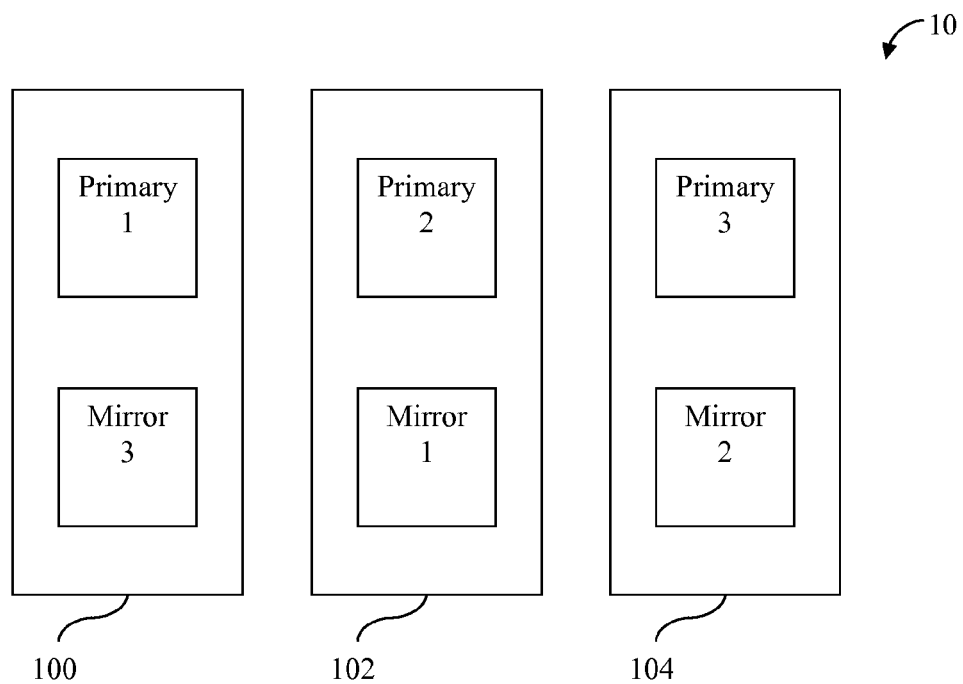
FIG. 1 is a diagram of a database in accordance with some embodiments.

FIG. 1 illustrates a multi-segment database in accordance with some embodiments. Database 10 includes Hosts 100, 102, and 104. Host 100 has two segments, Primary 1 and Mirror 3. Host 102 has two segments, Primary 2 and Mirror 1. Host 103 has two segments, Primary 3 and Mirror 2. If any host fails, another host will have a working copy.

When a segment fails, it may be considered a non-active segment. The non-active segment's mirror (or primary if the mirror fails) may be considered an active segment. In some embodiments, when the segment fails, the active segment will shift operation to "change tracking" mode.

The shift to "change tracking" mode is transparent to the user. A user may continue to access and use the database without being aware that any segment failed. There are no restrictions on the use of allowed operations. In some embodiments, during change tracking mode, the active segment may intercept its local write ahead log (WAL), writes, stores metadata for changes, and receive all write-related changes that will need to be synchronized with the non-active segment during the resynchronization process. These write-related changes are stored in a change tracking log.

Figure 2:
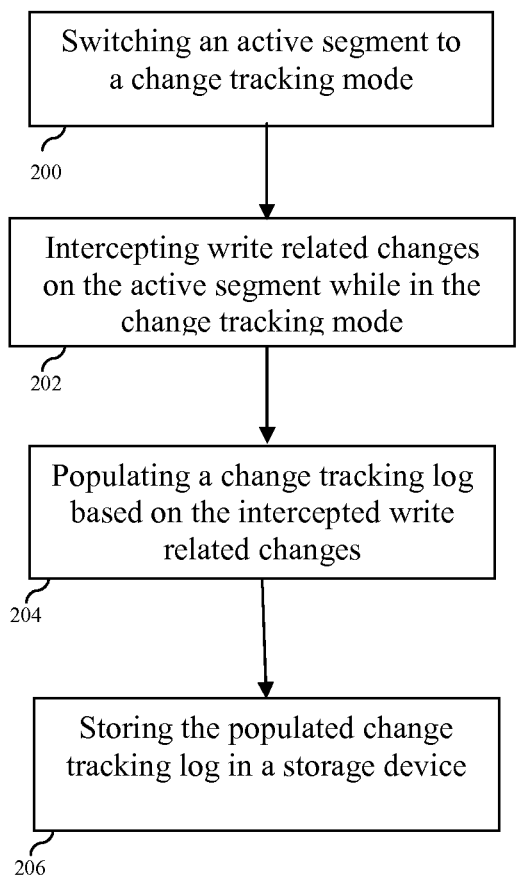
FIG. 2 is a flowchart of a method to recover databases in accordance with some embodiments

FIG. 2 illustrates a method to recover a database in accordance with some embodiments. In step 200, an active segment is switched to a change tracking mode. In step 202, write related changes on the active segment are intercepted while the active segment is in change tracking mode. In step 204, a change tracking log is populated based on the intercepted write related changes. In step 206, the populated change tracking log is stored in a storage device.

In some embodiments, the change tracking log is kept in memory for performance. This may be preferable since the performance of memory is greater than writing and reading to and from disk. However, if there are numerous changes and the change tracking log becomes too large, it may be preferable in some embodiments to flush the change tracking log to disk in order to avoid consuming too much memory. "Flushing" means transferring the change tracking log from memory and storing it on disk and emptying the change tracking log in memory. This allows for future changes to be stored in the change tracking log in memory. The change tracking log may be flushed according to a variety of policies. For example, in some embodiments, a policy may dictate that if the change tracking log consumes more than 10% of the available memory, the change tracking log will be flushed to disk. In some embodiments, the change tracking log may be flushed according to a predetermined schedule. For example, a policy may dictate that the change tracking log will be flushed to disk after every database checkpoint. In some embodiments, the "fsync( )" function may be used to flush from the change tracking log from memory to a persistent media, such as a disk. In some embodiments, the change tracking log may be flushed to disk when a checkpoint occurs, or when memory gets full—which ever happens first.

However, it is possible that the change tracking log stored on disk may also become too large. One problem with a large change tracking log is that it consumes too much disk space. Another problem with a large change tracking log is that it contains too many changes, and it will take a good amount of time and resources to go through all the changes.

The enhanced techniques described herein compact the change tracking log to reduce the amount of space it consumes and to reduce the amount of changes that are required during resynchronization. In some embodiments, a processing thread may continuously compact a change tracking log to reduce its size. Compacting eliminates duplicates. If a particular block is captured multiple times, then only the latest is kept.

In some embodiments, the change tracking log captures metadata of all write-related changes from the WAL. WAL captures metadata and data of all write related changes. However, not all of these changes are required to synchronize the non-active segment with the active segment. For example, suppose the following changes are recorded:

| Log Sequence Number | Data Block | Action |
| --- | --- | --- |
| 1 | 100 | Write A |
| 2 | 100 | Write B |
| 3 | 100 | Write A |
| 4 | 100 | Write C |
| 5 | 101 | Write B |
| 6 | 101 | Write D |

In this case, A would have been written to Data Block 100, then B, then A again, and then C. The end result of Data Block 100 is that C is written. However, if the all the changes are performed, it will take a total of four steps before Data Block 100 has C written. Further, some of these steps include redundant writes (e.g. A is written twice to Data Block 100). In a large database environment, with potentially thousands of similar writes, the expense of walking through all the changes may be too great.

To reduce the size of the change tracking log, and to reduce the number of changes that need to be walked through, a processing thread or script may be used to analyze the change tracking log for duplicate and unneeded change tracking records. For example, in some embodiments a processing thread may only retain the most recent record for a specific data block. In the example above, the processing thread would only retain Log Sequence Number (LSN) 4 and LSN 6. LSN 4 is the highest (e.g. most recent) log transaction record for Data Block 100, and LSN6 is the most recent log transaction record for Data Block 101. Since log sequence numbers increment by one, it may be preferable to determine redundant or unnecessary records based on log sequence numbers and their associated data blocks.

The intervals at which to compact the change tracking log may vary, depending on policy or administrator preference. In some embodiments, the change tracking log may be constantly monitored, such that as soon as a new LSN record is associated with a data block, all previous LSN records are tossed out. However, this method may be processor intensive. In some embodiments, the change tracking log may be compacted based on a pre-determined interval. For example, the change tracking log may be compacted every five minutes. In some embodiments, the change tracking log may be compacted based on a pre-determined size. For example, the change tracking log may be compacted once it reaches 5 MB in size, or the change tracking log may be compacted once it reaches 1% of the capacity of the storage media it resides in.

Once the non-active segment is ready for synchronization, it may be preferable to perform one more round of compacting on the change tracking log(not necessary if continuously monitored). This may be done to ensure that the change tracking log is as small as it can be, yet still contain all the necessary information for a reliable recovery. Benefits of a small log include having to resynchronize less data, and an accordingly shorter resynchronization period.

Figure 4:
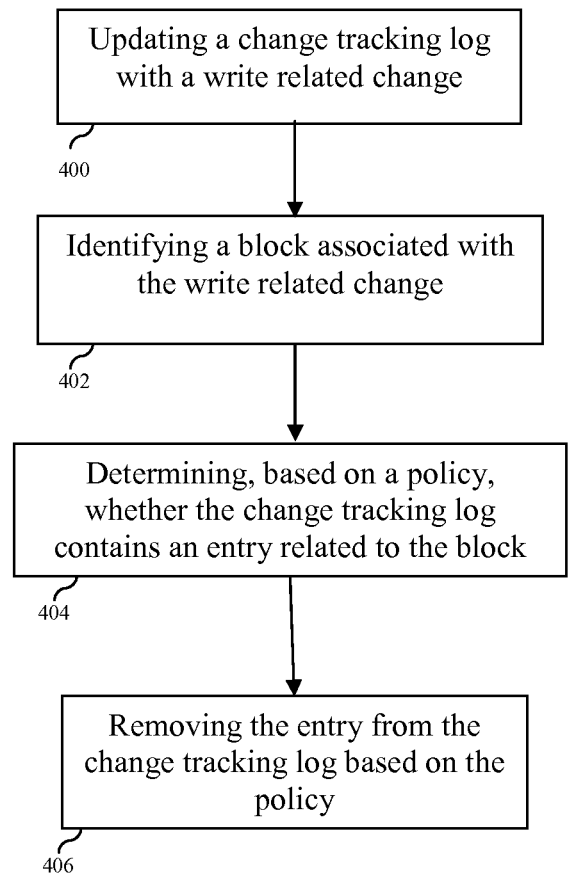
FIG. 4 is a flowchart of a method to recover databases in accordance with some embodiments.

FIG. 4 illustrates a method to recover a database in accordance with some embodiments. In step 400, a change tracking log is updated with a write related change. In step 402, a block associated with the write related change is identified. In step 404, it is determined, based on policy, whether the change tracking log contains an entry related to the block. In step 406, the entry is removed from the change tracking log based on policy.

When the resynchronization process begins, the process looks to the change tracking log to determine which data blocks have changed. Only the blocks that have changed during the change-tracking phase are resynchronized. The blocks that are not copied are already on the non-active segment. In the example above, only Data Blocks 100 and 101 changed. To illustrate, if the above example had one thousand data blocks, and only Data Blocks 100 and 101 were changed, only two data blocks would need to be resynchronized. The other 998 data blocks would not need to be resynchronized. Thus, there is potential to drastically improve the performance and resource usage of resynchronization using the enhanced techniques described herein.

Figure 3:
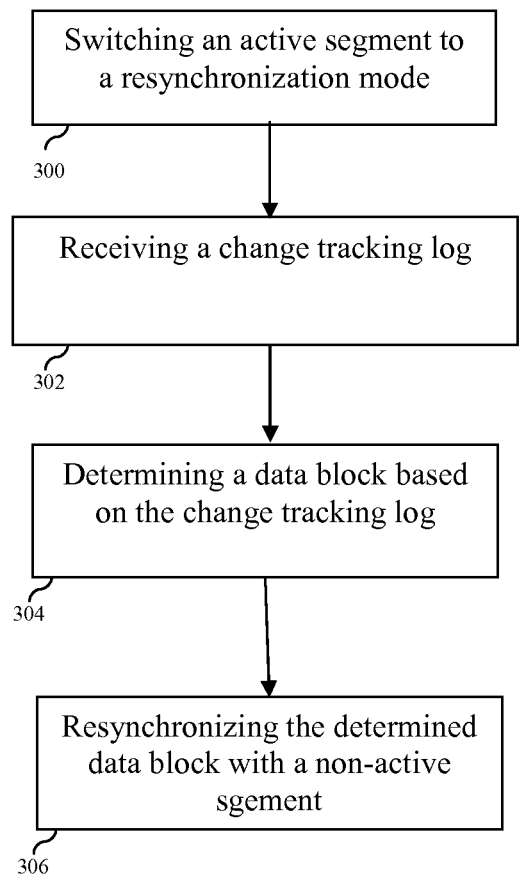
FIG. 3 is a flowchart of a method to recover databases in accordance with some embodiments.

FIG. 3 illustrates a method to recover a database in accordance with some embodiments. In step 300, an active segment is switched to a resynchronization mode. In step 302, a change tracking log is received. In step 304, a data block is determined based on the change tracking log. In step 306, the determined data block is resynchronized with the non-active segment.

The active segment drives the resynchronization process. During resynchronization, the active segment transitions to "Resynchronization" mode. Users are still able to do any previously allowed I/O activity to the active segment. Thus, the user is again unaware of the change in modes. As the user writes and performs I/O, those writes are immediately synchronized with the non-active segment during the resynchronization phase. Once the non-active segment has become fully synchronized with the active-segment, the database can resume normal operation.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for recovering a database, comprising:
   switching an active segment to change tracking mode;
   intercepting a write related change on the active segment while in the change tracking mode;
   populating a change tracking log with records based on the intercepted write related change, wherein the records are associated with a log sequence number;
   identifying a block associated with the write related change;
   determining, based on a policy, whether the populated change tracking log contains an old entry related to the block;
   removing the old entry without making write related changes dictated by the old entry based on the policy, wherein the policy dictates that if when multiple records exist for a given data block, only the record with the largest log sequence number is retained and wherein the identifying, the determining, and the removing occur based on a policy trigger; and
   storing the populated change tracking log in a storage device.

2. The method as recited in claim 1, wherein the storage device is memory.

3. The method as recited in claim 2, further comprising flushing the change tracking log from memory to disk.

4. The method as recited in claim 3, wherein flushing the change tracking log is based on a size of the change tracking log.

5. The method as recited in claim 3, wherein flushing the change tracking log is based on a database checkpoint.

6. A system for processing recovering a database, comprising a storage device and hardware processor configured to:
   switching an active segment to change tracking mode;
   intercepting a write related changes on the active segment while in the change tracking mode;
   populating a change tracking log with records based on the intercepted write related changes, wherein the records are associated with a log sequence number;
   identifying a block associated with the write related change;
   determining, based on a policy, whether the populated change tracking log contains an old entry related to the block;
   removing the old entry without making write related changes dictated by the old entry based on the policy, wherein the policy dictates that if multiple records exist for a given data block, only the record with the largest log sequence number is retained and wherein the identifying, the determining, and the removing occur based on a policy trigger; and
   storing the populated change tracking log in the storage device.

7. A computer program product for recovering databases, comprising a non-transitory computer readable medium having program instructions embodied therein for:
   switching an active segment to change tracking mode;
   intercepting a write related change on the active segment while in the change tracking mode;
   populating a change tracking log with records based on the intercepted write related change, wherein the records are associated with a log sequence number;
   identifying a block associated with the write related change;
   determining, based on a policy, whether the populated change tracking log contains an old entry related to the block;
   removing the old entry without making write related changes dictated by the old entry based on the policy, wherein the policy dictates that if multiple records exist for a given data block, only the record with the largest log sequence number is retained and wherein the identifying, the determining, and the removing occur based on a policy trigger; and
   storing the populated change tracking log in a storage device.

* * * * *